United States Patent Office 2,773,832
Patented Dec. 11, 1956

2,773,832
REACTION PRODUCT OF HEXACHLOROCYCLO-PENTADIENE WITH THIOL COMPOUNDS AND LUBRICANTS CONTAINING SAME

Ellis K. Fields, Chicago, Ill., assignor to Standard Oil Company, Chicago, Ill., a corporation of Indiana No Drawing. Application November 28, 1952,
Serial No. 323,141

2 Claims. (Cl. 252—48.8)

This invention relates to novel derivatives of hexachlorocyclopentadiene and to the method of preparing same; more particularly it relates to novel compositions of matter prepared by reacting hexachlorocyclopentadiene with a compound containing an active —SM group wherein M may be hydrogen or an alkali metal.

It is an object of the present invention to provide novel sulfur and chlorine containing compounds which are useful for many purposes such as additives in lubricating oils for imparting extreme pressure properties to such oils. It is a further object to provide a method of preparing novel sulfur and chlorine containing compounds which are useful as intermediates in the preparation of various sulfur and chlorine containing organic compounds. Additional objects will be apparent from the following detailed description of the present invention.

Briefly, the present invention relates to novel sulfur containing derivatives of hexachlorocyclopentadiene and to the method whereby such derivatives may be prepared by reacting that compound with a compound containing at least one active thiol group. In accordance herewith, the term "active thiol group" shall refer to the reactive group —SM, wherein M may be hydrogen or an alkali metal, e. g. sodium or potassium. The two methylene chloride atoms at the 5-position on hexachlorocyclopentadiene are the most reactive and are replaced first at temperatures of from about 50° F. to about 215° F. The remaining chlorine atoms appear to be attacked at somewhat higher temperatures, e. g. 160° F. to about 300° F. Hexachlorocyclopentadiene should be employed in excess of the stoichiometric amount when reaction of only one chlorine atom is desired and the sulfur compound is preferably added to the hexachlorocyclopentadiene. An alcohol solvent such as methanol is preferably employed during the reaction although benzene or other suitably inert solvent may be used. The reactants are then agitated for from about 1 to 48 hours, usually about 2 to 10 hours, filtered and purified to obtain the derivatives of the present invention.

Hexachlorocyclopentadiene may be readily prepared by reacting an aliphatic hydrocarbon containing at least 5 carbon atoms or an alicyclic hydrocarbon containing 5 carbon atoms in the ring, or the chlorinated derivatives of these compounds, with chlorine at temperatures between about 650° F. and 1025° F. The 5 carbon atom alicyclic hydrocarbons having the five carbon atoms in the ring, and 5 carbon atom aliphatic hydrocarbons wherein the number of carbon atoms in the longest straight chain is 4 or 5 are particularly suitable for the preparation of hexachlorocyclopentadiene in this manner. Since a detailed description of this method of preparing hexachlorocyclopentadiene is set forth in U. S. 2,509,160 it is considered unnecessary herein to further describe the method of preparation. It should be understood, however, that this invention is in no way directed or limited to any particular method of preparing hexachlorocyclopentadiene.

Compounds containing an —SH group will react with hexachlorocyclopentadiene in accordance herewith, but since many of these compounds are substantially unstable and are ordinarily unavailable as such, it is preferred to employ the alkali metal salt of such unstable thiol derivatives. Thus, for example, xanthic acids, thiocarbonic acids, thiocarbamic acids, thiolic acids, and dithionic acids are compounds of the type which will form derivatives in accordance with the present invention but since these compounds are more or less unstable in the acid form, the alkali salts thereof are preferably employed.

Mercaptans and the alkali metal mercaptides thereof which may be represented empirically by the formula RSM wherein R is a hydrocarbon radical and M may be either hydrogen or an alkali metal, e. g. sodium or potassium, will react with hexachlorocyclopentadiene in accordance with the present invention. As examples of such compounds, are methyl mercaptan, ethyl mercaptan, butyl mercaptan, hexyl mercaptan, dodecyl mercaptan, octadecyl mercaptan, benzyl mercaptan, thiophenol, etc.

In each of the classes of organic compounds referred to empirically herein, the hydrocarbon radicals represented by R or R' may be alkyl, arylalkyl, cycloalkyl aryl, and these may be substituted with various reactive groups which do not take part in the reaction with hexachlorocyclopentadiene, e. g. carboxyl, hydroxyl, nitro-, etc.

The alkali metal salts of the various xanthic acids having the formula ROCSSM, wherein R is a hydrocarbon radical preferably containing from 1 to 24 carbon atoms, e. g. ethyl, butyl, isoamyl, lauryl, octadecyl, phenyl, etc., may likewise be reacted with hexachlorocyclopentadiene in accordance with the present invention.

The alkali metal salts of the thiocarbonic acids containing an active thiol group which have the general formula $M_2S_xCO_y$ wherein $x$ is a positive integer from 1 to 3 inclusive and $y$ may be 0, 1 or 2 will react with hexachlorocyclopentadiene in accordance herewith. Examples of this type of compound are the sodium, or potassium salts of thiocarbonic acid, dithiolcarbonic acid, and trithiocarbonic acid. In addition, the organic derivatives of such salts, e. g. sodium or potassium salts of methyl trithiocarbonic acid, hexyl trithiocarbonic acid, lauryl dithiocarbonic acid, etc. will react in accordance herewith. Such compounds have an organic radical, e. g. a hydrocarbon radical, replacing one of the alkali metal atoms.

The alkali metal salts of the thiocarbamic acids having the general formula $RR'NCO_yS_xM$ wherein either or both R and R' may be hydrogen or a hydrocarbon radical preferably containing from 1 to 24 carbon atoms, $y$ may be 0 or 1 and $x$ may be 1 or 2, will react with hexachlorocyclopentadiene to form novel compounds in accordance with the present invention. Examples of such compounds are the sodium or potassium salts of thiolcarbamic acid ($H_2NCOSM$), and dithiocarbamic acid ($H_2NCSSH$) and the various hydrocarbon substituted analogs of these salts, e. g. the dibutyl dithiocarbamates, dibenzyl dithiocarbamates, ethylhexyl dithiocarbamate, diethyl thiolcarbamate, lauryl thiolcarbamate, dioctadecyl dithiocarbamate, etc.

Another group of compounds which react with hexachlorocyclopentadiene are the thiolic acids and their salts having the general formula RCOSM wherein R is a hydrocarbon radical, which may be alkyl, aryl, alkyl aryl, cycloalkyl, preferably containing from 1 to 24 carbon atoms Examples of such compounds are thioacetic acid, thiobutyric acid, thiobenzoic acid, thiolauric acid, thiostearic acid, etc. and alkali metal salts thereof.

In like manner the dithio acids, sometimes referred to as dithionic acids, and their alkali metal salts having the general formula $RCS_2M$ will form the novel compositions of the present invention when reacted with hexachlorocyclopentadiene. R is a hydrocarbon radical preferably containing from 1 to 24 carbon atoms, e. g. methyl, propyl, nonyl, dodecyl, octadecyl, phenyl, cyclohexyl, etc.

The thiosulfonic acids and their salts may likewise be reacted with hexachlorocyclopentadiene to prepare novel compositions of matter in accordance with the present invention. These compounds have the general formula $RSO_2SM$ wherein R is a hydrocarbon radical preferably containing from 1 to 24 carbon atoms. Examples of such compounds are methyl thiosulfonic acid, octadecylthiosulfonic acid, toluene thiosulfonic acid, etc.

It should be understood that the suggestion of various specific active thiol group containing compounds herein is not intended to function expressly or impliedly for the exclusion of others coming within the definitions hereinabove set forth.

The reaction of the foregoing active thiol compounds with hexachlorocyclopentadiene is preferably conducted with the alkali metal derivative of the sulfur compound but the thio-compound itself may be employed as such. Those compounds, such as mercaptans, which are sufficiently stable in the —SH form may be reacted with hexachlorocyclopentadiene but it is preferred to conduct such a reaction in the presence of a reagent such as sodium ethylate, sodium methylate, or the like, thus resulting in the reaction of the alkali salt with hexachlorocyclopentadiene.

Based upon the number of chlorine atoms it is desired to replace the hexachlorocyclopentadiene will ordinarily be contacted with from about 0.003 to about 10 moles of thiol type compound. As indicated, it is necessary to maintain a substantial excess, e. g. from 10% to 300% of hexachlorocyclopentadiene, when it is desired to replace only one chlorine atom.

Without being bound by any theory herein expressed or implied as to the exact mechanism by which the novel compositions are produced, it appears that the reaction of hexachlorocyclopentadiene and an active thiol-containing compound, e. g. a sodium mercaptide or trithiocarbonate, proceeds as follows:

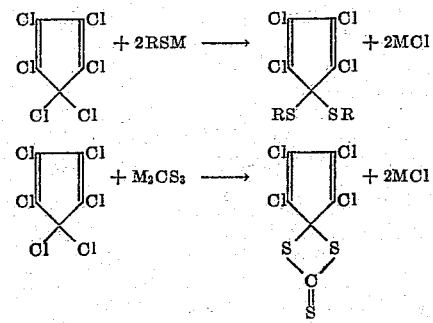

wherein R is an organic radical, e. g. a hydrocarbon radical, and M is an alkali metal. The reaction of hexachlorocyclopentadiene and other types of active thiol containing compounds proceeds in essentially the same manner.

A reaction temperature in the range of from about 50° F. to about 300° F., depending upon the reactants, may be employed. Thus, the methylene chloride atoms react first at temperatures of from about 50° F. to about 250° F. and the remaining chlorine atoms are attacked at somewhat higher temperatures, e. g. about 160° F. to about 300° F. In general, higher reaction rates are obtainable with increasing temperatures.

The reaction is preferably effected in the presence of inert solvents such as certain lower alcohols, e. g. ethanol, methanol, etc., dioxane, methyl Cellosolve, liquid hydrocarbons, etc. However, the present process will proceed in the absence of inert solvents.

The process may be carried out batch-wise, continuously or semi-continuously. The particular reaction equipment employed forms no part of the present invention and, therefore, need not be set forth in detail. Reactions of the present invention can be carried out in conventional reaction kettles or autoclaves.

In Table 1 is set forth information on compounds prepared in accordance with the present invention. This information, as well as that in the following operating example, is included herein for the purpose of specifically illustrating the invention without necessarily limiting the same. The following operating example corresponds to Example 1 in Table 1:

0.27 mole of hexachlorocyclopentadiene was added slowly to a solution of the sodium salt of n-hexyl mercaptan comprising .4 mole of the mercaptan and .4 mole of sodium methylate in 250 cc. of methanol. A vigorous exothermic reaction occurred. The mixture was refluxed for about one hour; the resulting product was filtered to remove sodium chloride and the filtrate was evaporated in vacuum at 158° F. giving 103 grams of a very dark mobile liquid which was soluble in mineral oil.

In the examples set forth in Table 1, no particular effort was exerted to obtain optimum yields; accordingly, no reference is made in the table to yields. For the most part, however, the yields were satisfactory, usually substantially theoretical based upon hexachlorocyclopentadiene.

The new products of this invention may be readily reacted with dienophiles such as maleic anhydride, acrolein, acrylonitrile, ethyl acrylate, etc., to give further novel compositions, for example:

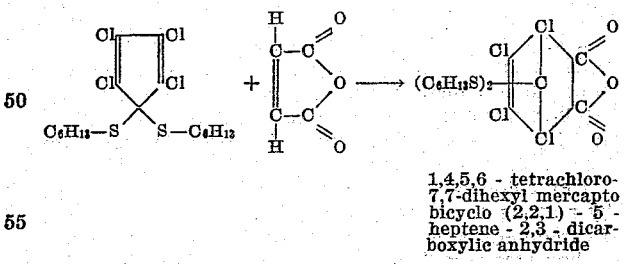

1,4,5,6 - tetrachloro-7,7-dihexyl mercapto bicyclo (2,2,1) - 5 - heptene - 2,3 - dicarboxylic anhydride

Table

| Example | Thiol Reactant | Type | Ratio of Thiol Reactant to $C_5Cl_6$ | Product Calculated Cl, percent (Based on Structure) | S, percent | Product Found Cl, percent | S, percent |
|---|---|---|---|---|---|---|---|
| 1 | n-hexyl mercaptan | RSM | 1.5:1 | 31.3 ($C_5Cl_4(SC_6H_{13})_2$) | 15.15 | 31.32 | 14.67 |
| 2 | n-hexyl mercaptan | RSM | 4:1 | 14.2 ($C_5Cl_2(SC_6H_{13})_4$) | 25.7 | 14.9 | (*) |
| 3 | n-hexyl mercaptan | RSM | 6:1 | 0 ($C_5(SC_6H_{13})_6$) | 25.2 | 0.8 | 26.5 |
| 4 | K ethyl xanthate | ROCSM (S) | 2:1 | 20.1 ($C_5Cl_5(S_2COOC_2H_5)_3$) | 36.3 | 20.6 | 36.1 |
| 5 | Na octyl thioglycollate | NaSRCOR' (O) | 2:1 | 23.4 ($C_5Cl_4(SCH_2COOC_8H_{17})_2$) | 10.5 | 18.9 | 14.7 |
| 6 | Na hexyl trithiocarbonate | $M_2S_2CO$ | 2:1 | 24.1 ($C_5Cl_2(SCS_2C_6H_{13})_2$) | 32.6 | 28.0 | 32.8 |
| 7 | Na dibutyl dithiocarbamate | RR'NCO$_2S_2M$ | 2:1 | 23.3 ($C_5Cl_4[SCSN(C_4H_9)_2]_2$) | 21.0 | 25.4 | 19.6 |

*No sulfur analysis obtained.

The anhydride so produced may be readily hydrolyzed to the acid which has excellent rust inhibiting properties when added to mineral oils such as turbine oils, etc.

The di-mercapto product of Example 1 in the table above was tested as an E. P. agent in SAE 30 lubricating oil. 2% of that product in such oil resulted in a lubricant which carried a load of 80 kg. without seizing and which did not weld until a load of 300 kg. was reached when tested in the Shell 4-ball E. P. test machine ("Four-Ball Testing Apparatus for Extreme Pressure Lubricants," Boerlage, Engineering 136, 46 (1933)). This compares to a load of only 60 kg. for such oil without the additive. Products of the present invention may be added to lubricating oil for the purpose of imparting extreme pressure properties thereto, in an amount of from 0.2 to about 20% and preferably from about 0.5 to about 10%.

As set forth hereinabove, the compounds which may be reacted with hexachlorocyclopentadiene in accordance herewith are those containing an "active thiol group," i. e. compounds containing a reactive —SM group where M may be hydrogen or an alkali metal. And as enumerated in detail, this active thiol group may be part of a large number of different classes of organic thio-compounds. When such compounds are reacted with hexachlorocyclopentadiene, either hydrogen chloride or an alkali chloride is split out and the remainder or residue of the original thio-compound is, as hereinabove described, attached to a carbon in the ring replacing a chlorine atom. For the sake of brevity and mechanical simplicity, these residues of the original thiol compound which after reaction are attached to the cyclopentadiene ring by a sulfur-carbon bond will be designated by the letter Z in the appended claims.

Having thus described my invention, what I claim as novel and desire to protect by Letters Patent is as follows:

1. A mineral lubricating oil and between about 0.2 and about 20% by weight, based on said oil, of a compound having the formula

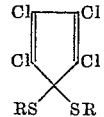

wherein R is an alkyl radical having from 1 to 18 carbon atoms, inclusive.

2. The composition of claim 1 wherein R is a hexyl radical.

References Cited in the file of this patent

UNITED STATES PATENTS

| | | |
|---|---|---|
| 2,454,108 | Walling | Nov. 16, 1948 |
| 2,503,290 | Norris | Apr. 11, 1950 |
| 2,697,103 | Ordas | Dec. 14, 1954 |

OTHER REFERENCES

Davy: "The Mechanism of Action of E. P. Lubricants," article in Scientific Lubrication, September 1949, pages 7–14.